Sept. 6, 1927.
G. C. JETT
1,641,436
SNAPPING ROLLS FOR CORN HARVESTERS
Filed April 25, 1924
2 Sheets-Sheet 2
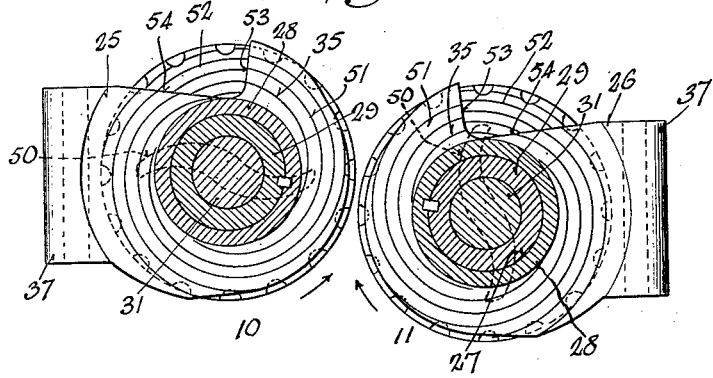
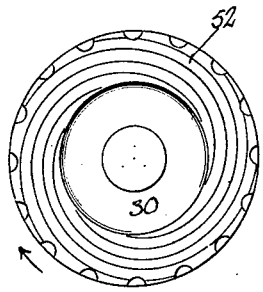
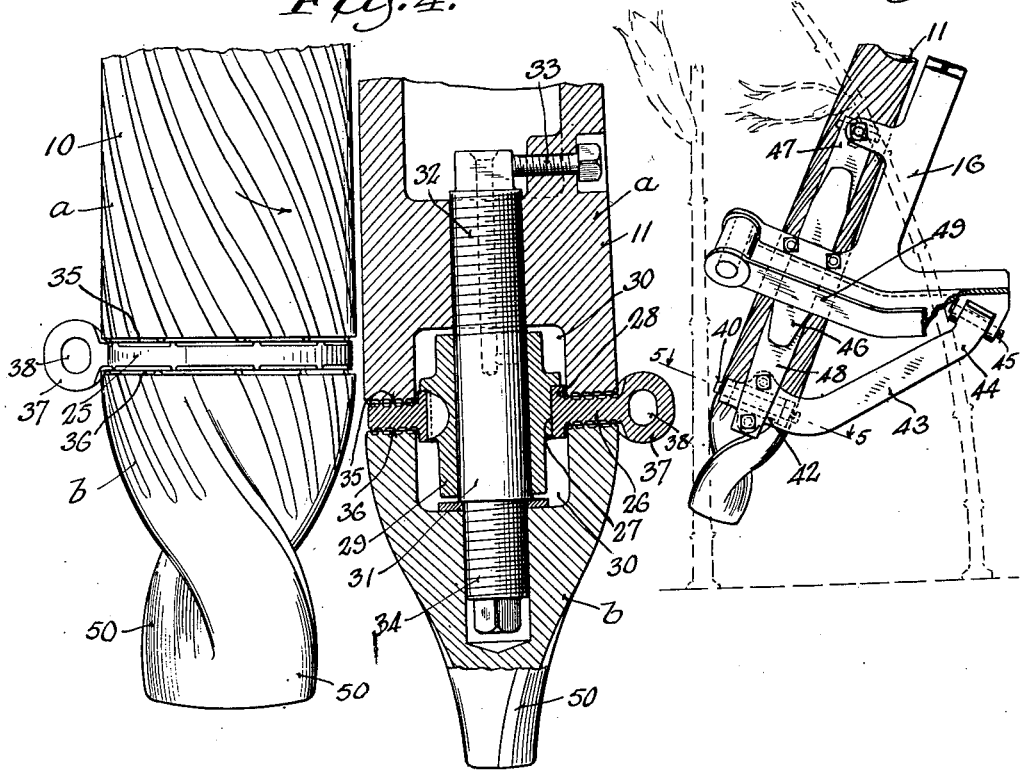
INVENTOR.
GEORGE C. JETT
BY
Ralph W. Brown
ATTORNEY.

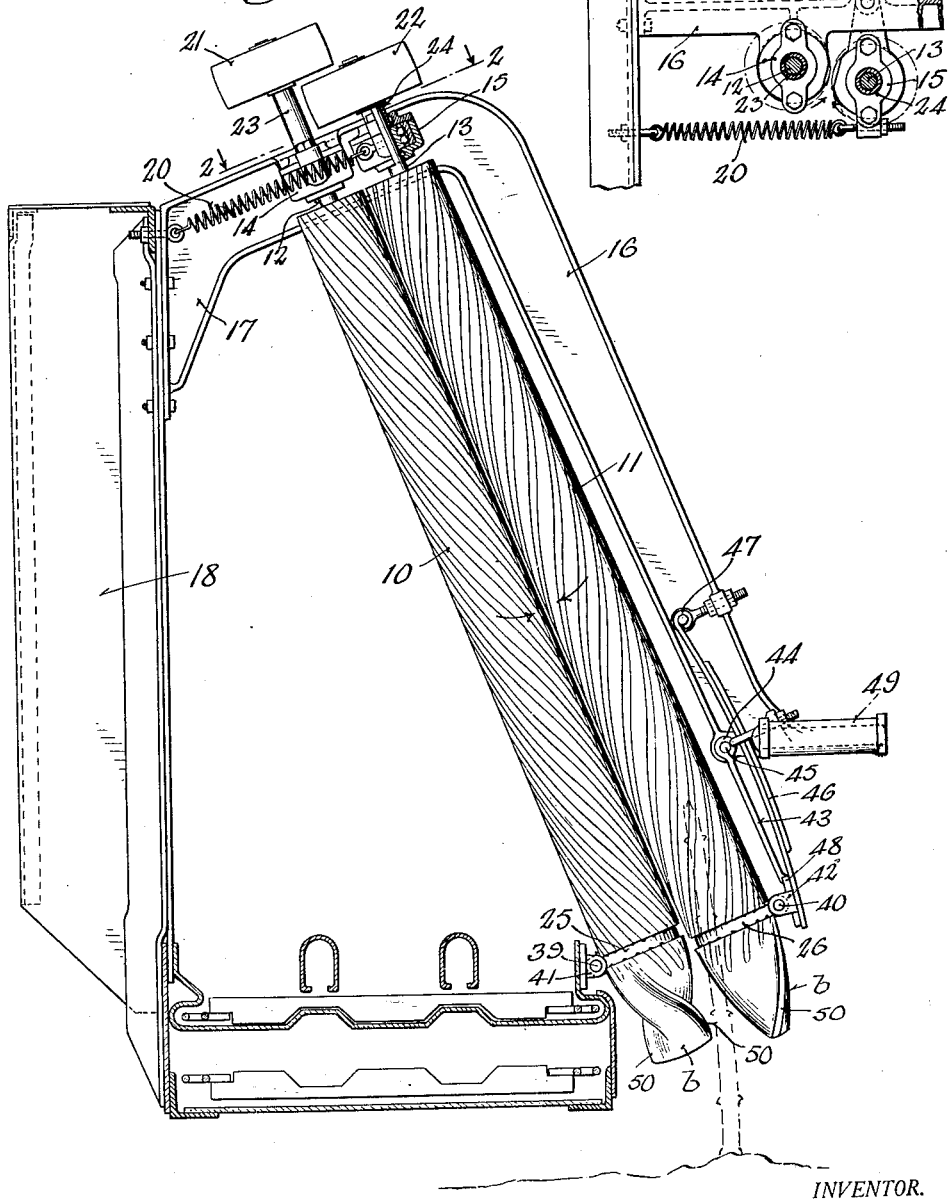

Patented Sept. 6, 1927.

1,641,436

UNITED STATES PATENT OFFICE.

GEORGE C. JETT, OF MILWAUKEE, WISCONSIN, ASSIGNOR OF TWO-FIFTHS TO WALTER H. STEIMKE, OF MILWAUKEE, WISCONSIN.

SNAPPING ROLL FOR CORN HARVESTERS.

Application filed April 25, 1924. Serial No. 708,867.

This invention relates to corn harvesters and, more particularly, to snapping rolls therefor.

Corn harvesting machines, of the type designed to remove the ears from the standing stalks during the passage thereof along a row of corn, have not heretofore proven entirely successful. In fact, such machines have failed to become generally adopted because of their failure to remove such a large percentage of the corn. The removal of the ears is ordinarily effected by a pair of cooperating snapping rolls having a very limited effective range of operation. It is largely due to this limited operating range, the crookedness of the rows of corn, and the fact that the machine deviates more or less from its proper course of travel, that the machine fails to strip all the ears from the stalks.

One object of the present invention is the provision of a pair of snapping rolls so constructed and arranged as to afford an increased operating range.

Another object is the provision of improved means for mounting the snapping rolls.

These and other objects and advantages will appear from the following description of an illustrative embodiment of the present invention.

In the accompanying drawings:

Figure 1 is a face view of a pair of snapping rolls constructed and mounted in accordance with the present invention.

Figure 2 is a sectional view taken substantially along the line 2—2 of Figure 1.

Figure 3 is a fragmentary view in elevation looking toward the left in Figure 1.

Figure 4 is a face view of the lower portions of the rolls, one of the rolls appearing in section.

Figure 5 is a sectional view taken substantially along the line 5—5 of Figure 3.

Figure 6 is an end view of one of the rolls with the bearing bracket removed.

The snapping rolls 10 and 11 shown are designed for use in the corn harvesting machine described in my copending application, Serial No. 462,481, filed May 31, 1923. These rolls are provided at their upper ends with shafts 12 and 13, respectively, journaled in bearing brackets 14 and 15 carried by an inverted L-shaped casting 16 fixed at one end 17 to the main frame 18 of the machine. Bearing bracket 14 is stationary while bracket 15 is pivotally mounted as at 19, so as to permit rocking movement away from bracket 14. A spring 20 yieldably retains bracket 15 in the position shown in Figures 1 and 2. The rolls 10 and 11 are driven in opposite directions by any appropriate means, such as pulleys 21 and 22, fixed to the upwardly projecting ends of the shafts 12 and 13. Thrust sustaining sleeves 23 and 24 on the shafts between the pulleys and brackets serve to sustain substantially the entire weight of the rolls.

The lower portions of the rolls are retained in operative position by hangers preferably such as will now be described. The hangers shown, particularly in Figures 1 and 4, are in the form of plates 25 and 26 each provided with a central opening 27 bounded by an annular flange 28 forming an appropriate seat for a bearing block 29 loosely fixed therein against rotation. Each roll is divided into separable sections $a$ and $b$ between which the hanger plate 25 or 26 is interposed. The mating ends of the two sections of each roll are hollowed out, as at 30, to accommodate the bearing block 29. A spindle 31 journaled in each bearing block is screwed at one end 32 into the section $a$ and fixed in adjusted position therein by a set screw 33. The other end 34 of the spindle 31 is similarly threaded to receive the end section $b$ of the roll. The arrangement is such that the spindle 31 provides a substantially rigid connection between the two sections $a$ and $b$ so that these sections together constitute a rigid unit. Each spindle is so adjusted as to provide a close sliding fit between the two faces 35 and 36 of each hanger plate 25 or 26 and the abutting faces of the roll sections.

Each hanger plate 25 or 26 is provided at one side with a thickened portion 37 having an opening 38 therethrough adapted to loosely receive a supporting pin 39 or 40. Pin 39 is mounted in a fixed bracket 41 carried by the main frame of the machine, and pin 40 is mounted in the end 42 of an arm 43 (see Figure 3). Arm 43 is pivotally mounted at its other end 44 upon a pivot pin 45 in the casting 16 so as to swing about an axis substantially normal to the plane of the rolls to thus permit the lower end of roll 11 to swing away from roll 10. A leaf spring 46 connected at its upper end 47 to the casting 16 and at its lower end 48 to the end 42 of arm 43, and bearing intermediate its ends against a rigid transverse arm 49 of the casting 16, yieldably retains the lower end of roll 11 in the position shown in Figure 1.

From an inspection of Figures 1 and 3 it will be noted that the rolls shown are inclined laterally and forwardly from the upper supporting brackets 14 and 15, the lower forward portions thereof being so disposed as to grip the stalks of corn a short distance above the ground. The stalks thus gripped by the rotating rolls are fed by and between the rolls as the machine advances along the row, the engagement of the rolls with each stalk progressing upwardly along the stalk and rolls as the feed progresses, the ears, as they are encountered by the rolls, are removed thereby from the stalks because of the fact that they are too large to pass between the rolls. This action of the rolls is well known in the art and need not be further described.

By inclining the rolls, the lower ends thereof or stalk gripping portions engage the stalks near the ground where they are usually free from ears, and commence feeding them backwardly to the upper or ear removing portions of the rolls constituting approximately the upper two thirds length thereof. The ear removing portions, in view of their smaller diameters, resist the entry of the ears between the rolls, and in their encounter with the ear bearing portion of the stalk they effectively remove the ears. The lower or stalk gripping portions which are ineffective for snapping since their large diameters permit the entry of ears therebetween, are effective in gripping the ear free portions of the stalks near the ground so that by tapering and inclining the rolls, a novel and very effective corn snapper is produced.

The operating range of the rolls is obviously limited by the maximum width of the wedge-like space or throat between the lower portions of the rolls through which the stalks must pass in order to enter between the rolls. The width of the throat is, of course, dependent upon the distance between the axes of the rolls at the lower end thereof or, in other words, upon the diameters of the lower ends of the rolls. It is well recognized that in order to efficiently remove the ears from the stalks the diameters of the rolls must not exceed certain defined limits. I have discovered, however, that it is wholly possible to increase the diameters of the lower stalk gripping ends of the rolls to thereby increase the throat and consequently the operating range of the rolls and at the same time retain the ear removing portions of the rolls at such diameters as to effectively remove the ears. This I accomplish by tapering the rolls as indicated in Figure 1. Upon reference to this figure it will be noted that the lower stalk gripping portions of the rolls are of considerably greater diameter than the upper ends thereof, and that to maintain a uniform spacing between the rolls, the axes thereof are relatively inclined.

To further increase the effective operating range of the rolls, end sections *b* thereof are preferably tapered off, as indicated in Figures 1 and 4, and formed with fluted spiral wings 50, which during rotation of the rolls tend to sweep the stalks into the throat.

By the use of hangers 25 and 26 disposed within the ends of the rolls, the use of external end bearings, which tend to restrict the throat, is avoided. The hanger plates 25 and 26 are made as thin as practicable and are preferably disposed in laterally offset relation, as indicated in Figures 1 and 4, so as to avoid the formation of a dead zone between the rolls.

In order to avoid the accumulation of vegetable matter between each of the hangers 25 or 26 and the rolls, the abutting faces of the hangers and rolls are preferably reversely spirally grooved as indicated at 51 and 52 in Figures 5 and 6. These grooves cooperate during rotation of the rolls to grind up all foreign matter that may enter between the faces and to eject the same therefrom. To permit this matter to pass freely from the rolls the plates 25 and 26 are preferably cut away, as at 53, behind the axes of the rolls. The edge 54 of this cut out portion extends diagonally across the grooves 52 and serves to scrape and eject the foreign matter therefrom as the roll rotates.

Another important advantage results from the use of tapered snapping rolls. The speed of rotation of the rolls is ordinarily such that the peripheral speed of the lower stalk gripping portions is substantially equal to the speed of advance of the machine. The upper portions of the rolls have a somewhat slower peripheral speed, however, due to the smaller diameter, so that during the advance of the machine the upper portions of the stalks are dragged forwardly causing them to assume an inclined or bent position, such as indicated in Figure 3. This angular relation between the stalks and the rolls has been found much more favorable for the removal of the ears than if the stalks remained in a substantially vertical position.

Various changes may be made in the embodiment of the invention hereinabove described, without departing from or sacrificing any of the advantages of the invention as defined in the appended claims.

I claim:

1. In a machine of the character described the combination of a rotating roll, a member closely fitted within said roll and projecting laterally therefrom for supporting said roll, and means for ejecting foreign matter from between contiguous surfaces of said roll and member.

2. In a machine of the character described the combination of a rotating roll, a member closely fitted within said roll and projecting laterally therefrom for supporting said roll, and cooperating grooves between contiguous faces of said roll and member for ejecting foreign matter therefrom.

3. In a machine the combination of a plurality of cooperating snapping rolls, and supporting means therefor, said supporting means including laterally offset means extending outwardly from said rolls and effective to support said rolls without restricting their throat or creating dead spaces between said rolls.

4. A snapping roll for corn harvesters, said roll being tapered off at one end and having wings projecting laterally from said tapered off end, said roll being arranged to permit lateral movement of the lower end thereof.

5. In a machine the combination of a plurality of uniformly spaced cooperating rolls tapered from end to end to define stalk gripping and ear removing portions, said rolls being inclined so as to grip the lowermost portion of the stalk.

6. In a corn harvesting machine the combination of a pair of cooperating snapping rolls tapered off at the forward ends thereof to form a stalk receiving throat, and supporting means for said forward ends connected therewith rearwardly of said throat to avoid restricting the same, said supporting means being offset, thereby rendering the rolls effective throughout their length.

7. In a corn harvesting machine the combination of a pair of tapered, inclined snapping rolls having stalk gripping portions, and supports for yieldably retaining said rolls in a uniformly spaced relation.

8. In a corn harvesting machine the combination of a pair of uniformly spaced snapping rolls inclined forwardly and laterally, said rolls being gradually tapered rearwardly from adjacent the forward ends thereof, said forward ends being tapered off sharply to form a stalk receiving throat, and wings projecting laterally from said tapered off ends to sweep the stalks into said throat.

In witness whereof, I hereunto subscribe my name this 11th day of April, 1924.

GEORGE C. JETT.